United States Patent
Wu et al.

(10) Patent No.: US 7,958,541 B2
(45) Date of Patent: Jun. 7, 2011

(54) METHOD, SYSTEM AND APPARATUS FOR PREVENTING MEDIA ACCESS CONTROL ADDRESS COUNTERFEITING

(75) Inventors: Haijun Wu, Shenzhen (CN); Jun Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 886 days.

(21) Appl. No.: 11/924,449

(22) Filed: Oct. 25, 2007

(65) Prior Publication Data

US 2008/0134291 A1    Jun. 5, 2008

Related U.S. Application Data

(63) Continuation of application No. PCT/CN2006/000782, filed on Apr. 25, 2006.

(30) Foreign Application Priority Data

Apr. 25, 2005  (CN) .......................... 2005 1 0066236

(51) Int. Cl.
*H04L 9/32* (2006.01)
*H04L 9/00* (2006.01)
*G06F 7/04* (2006.01)

(52) U.S. Cl. ............. 726/3; 726/4; 726/5; 726/6; 726/7; 713/168; 713/169; 713/170; 713/171; 713/172

(58) Field of Classification Search ................... 726/3
See application file for complete search history.

(56) References Cited

U.S. PATENT DOCUMENTS

| | | | |
|---|---|---|---|
| 6,115,376 A * | 9/2000 | Sherer et al. | 370/389 |
| 7,234,163 B1 | 6/2007 | Rayes et al. | |
| 2004/0172559 A1 | 9/2004 | Luo et al. | |
| 2004/0255154 A1 | 12/2004 | Kwan et al. | |
| 2005/0182946 A1* | 8/2005 | Shatford | 713/185 |

FOREIGN PATENT DOCUMENTS

| | | |
|---|---|---|
| CN | 1419363 A | 5/2003 |
| TW | 586285 B | 5/2004 |
| WO | WO 2004/025926 A1 | 3/2004 |

* cited by examiner

*Primary Examiner* — Longbit Chai
(74) *Attorney, Agent, or Firm* — Leydig, Voit & Mayer, Ltd.

(57) ABSTRACT

A method for preventing MAC address counterfeiting may include: receiving, by an authentication device, a source MAC address and access port information of an access port, wherein the source MAC address and the access port information are associated with an authentication request from the access port; determining, by the authentication device, whether the source MAC address received is a counterfeit MAC address according to the source MAC address received, the access port information received, and access port information that is stored in the authentication device and corresponds to the source MAC address received; and if the source MAC address received is a counterfeit MAC address, rejecting, by the authentication device, the authentication request. A system, an access device and an authentication device are also proposed.

17 Claims, 2 Drawing Sheets

METHOD, SYSTEM AND APPARATUS FOR PREVENTING MEDIA ACCESS CONTROL ADDRESS COUNTERFEITING

This application is a continuation of International Patent Application No. PCT/CN2006/000782, filed Apr. 25, 2006, which claims priority to Chinese Patent Application No. 200510066236.6, filed Apr. 25, 2005, both of which are hereby incorporated by reference.

FIELD OF THE INVENTION

The present invention relates to network communications, and particularly to a method, system and apparatus for preventing media access control address from being counterfeited.

BACKGROUND OF THE INVENTION

At present, such access devices as Digital Subscriber Line Access Multiplexer (DSLAM) and integrated access device have widely been applied for providing broadband access. Such access devices can provide variety of broadband accesses such as Asymmetrical Digital Subscriber Loop (ADSL), Single-line High-bit-rate Digital Subscriber Line (SHDSL), Very-high-data-rate Digital Subscriber Loop (VDSL), etc., to enable users to access broadband Internet and implement other services such as video services and IP telephone services.

At present, in order to implement authentication and charging for users, and avoid malicious access from illegal users, Media Access Control (MAC) address based filter criterions are employed to filter the users accessing the network.

However, with increase of the broadband users, some illegal users illegally access the broadband network by means of counterfeiting legal MAC addresses, and may run their illegal services or maliciously interfere with the normal services on the broadband network. For example, some illegal users may change legal users' MAC addresses using software tools to attack the legal users and interfere with the regular broadband services. Therefore, the broadband access network needs abilities to prevent MAC address counterfeiting.

A solution for preventing MAC address counterfeiting is binding a source MAC address with a source port. According to this solution, each user accessing the network is assigned with one or more source MAC addresses, and a relationship between a source MAC address and an access port is stored. In this way, on receipt of an Ethernet packet sent from a user via an access port, an access device determines whether the source MAC address of the packet matches the access port. If the source MAC address of the packet matches the access port, the access device forwards the packet to an upper layer of the broadband network; otherwise, the access device discards the packet. In accordance with this solution, each of the access ports needs to be assigned with at least a corresponding source MAC address and this is done randomly. When there are a large number of access ports in the broadband network, the workload for providing one or more source MAC addresses for each of the access ports is quite heavy. In addition, since the source MAC address is bound with the access port, if the user has a new PC or wants to change the current MAC address to another legal MAC address, the user has to reset the source MAC address in the access device for implementing services, which is quite complex and thus this solution is difficulty to be applied widely.

SUMMARY OF THE INVENTION

A method, a system and an apparatus for preventing MAC address counterfeiting are proposed by embodiments of this invention, in order to avoid MAC address counterfeiting and lighten the workload of the system without assigning one or more MAC addresses to each access port.

A method for preventing MAC address counterfeiting includes:

receiving, by an authentication device, a source MAC address and access port information of an access port, wherein the source MAC address and the access port information are associated with an authentication request from the access port;

determining, by the authentication device, whether the source MAC address received is a counterfeit MAC address according to the source MAC address received, the access port information received, and access port information that is stored in the authentication device and corresponds to the source MAC address received; and if the source MAC address received is a counterfeit MAC address, rejecting, by the authentication device, the authentication request.

A system for preventing MAC address counterfeiting includes:

an access device, configured to receive an authentication request from an access port, and send a source MAC address and access port information associated with the authentication request, and an authentication device, configured to receive the source MAC address and the access port information associated with the authentication request from the access device, determine whether the source MAC address received is a counterfeit MAC address according to the source MAC address received, the access port information received, and access port information that is stored in the authentication device and corresponds to the source MAC address received; and if the source MAC address received is a counterfeit MAC address, reject the authentication request.

An access device for preventing MAC address counterfeiting may include:

an access module, configured to receive an authentication request carrying a source MAC address from an access port, and send the authentication request;

an MAC address processing module, configured to receive the authentication request from the access module, and send the source MAC address and access port information of the access port, wherein the source MAC address and the access port information are associated with the authentication request; and an uplink interface module, configured to receive the source MAC address and the access port information from the MAC address processing module, and send the source MAC address and the access port information to an authentication device.

An authentication device for preventing MAC address counterfeiting includes:

an interface module, configured to receive a source MAC address and access port information of an access port, wherein the source MAC address and the access port information are associated with an authentication request from an access device, a processing module, configured to determine whether the source MAC address received is a counterfeit MAC address according to the source MAC address received, the access port information received, and access port information that is stored in the authentication device and corresponds to the source MAC address received; and if the source MAC address received is a counterfeit MAC address, reject the authentication request.

In accordance with the solution proposed by embodiments of this invention, on receipt of the source MAC address and access port information associated with an authentication request, the authentication device determines whether the source MAC address is a counterfeit MAC address. If the source MAC address is a counterfeit MAC address, the authentication device returns to the access device an authentication failure message. According to this solution, the access device does not need to assign one or more MAC addresses to each access port thereby releasing the workload of the system. In addition, even if a user changes an access port or a source MAC address, the access device does not need to reassign new MAC addresses, thereby releasing the workload of the system and simplifying operations. For at least the above reasons, the solution proposed by embodiments of this invention can be used widely.

DETAILED DESCRIPTION OF THE INVENTION

The present invention will be described hereinafter in detail with reference to accompanying drawings and embodiments.

Figure 1:
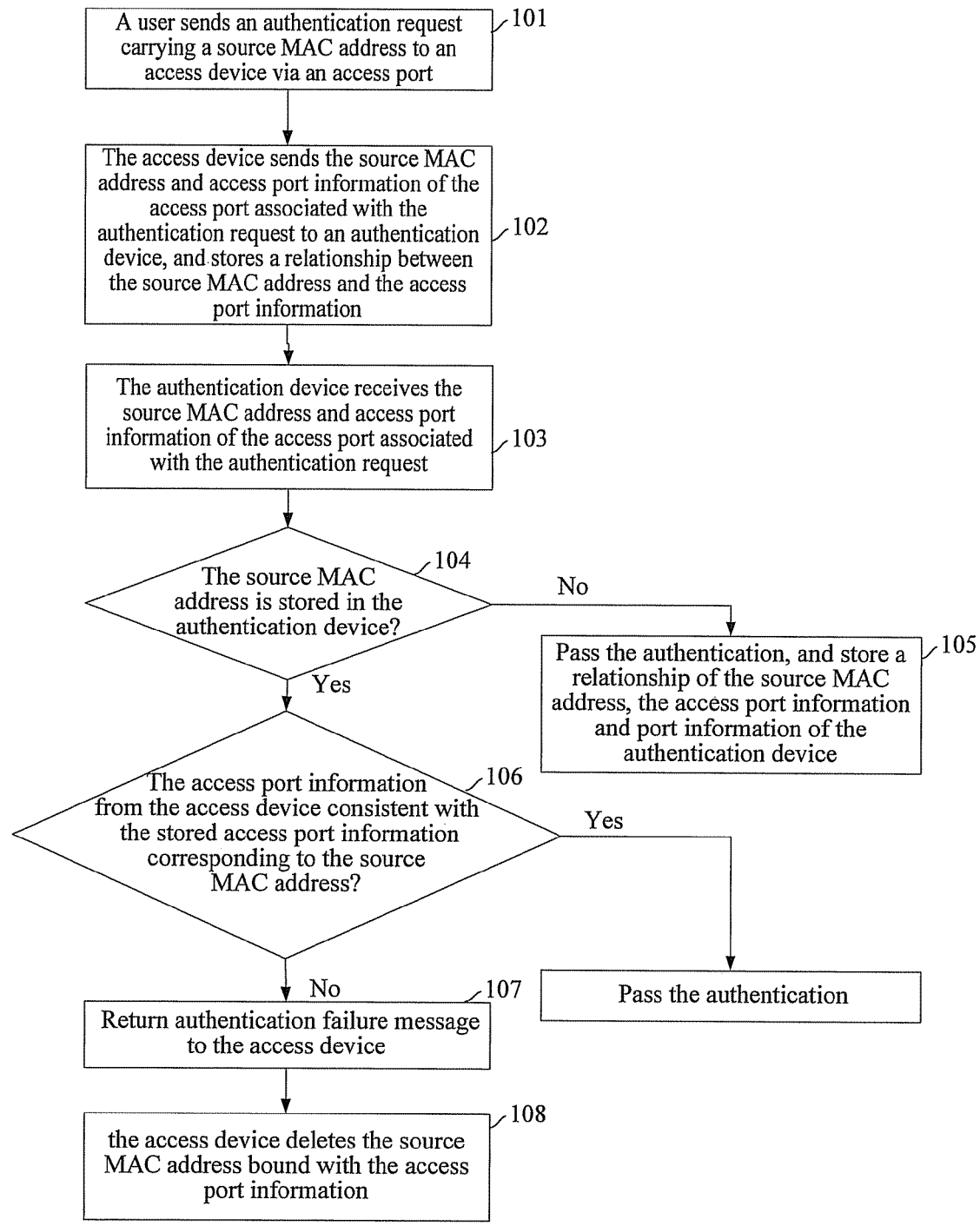
FIG. 1 is a flowchart of preventing MAC address counterfeiting in accordance with an embodiment of this invention.

FIG. 1 shows a flowchart for preventing MAC address counterfeiting in accordance with an embodiment of this invention. As shown in FIG. 1, several blocks may be included.

Block 101: a user sends an authentication request to an access device via an access port. The authentication request carries an MAC address (i.e., a source MAC address) of the access port.

When user A accessing the broadband network via access device A initiates an authentication process, user A sends to access device A an authentication request. The authentication request may be a Point to Point Protocol Over Ethernet (PPPOE) message, or a Dynamic Host Configuration Protocol (DHCP) message.

Block 102: after receiving the authentication request from the access port, the access device sends to an authentication device the source MAC address and access port information of the access port related to the authentication request, and stores a relationship between the source MAC address and the access port information of the access port.

Specifically, the access device may add the access port information into the authentication request, and send the authentication request to the authentication device; or send the access port information to the authentication device via a special communication protocol. For example, the access device sends the authentication request to the authentication device. On receipt of the authentication request, if the authentication device detects that the authentication request does not carry the access port information, the authentication device sends to the access device an enquiry message carrying the source MAC address. On receipt of the port enquiry message, the access device sends to the authentication device the access port information corresponding to the source MAC address.

The access device may also add the access port information into a PPPOE or a DHCP or a PPPOA authentication message, or convert the PPPOA message into the PPPOE message and add the access port information into the PPPOE message.

The access port information is physical address information of the access port, such as physical port information of the access port, Virtual Local Area Network (VLAN) information of the access port, Virtual Path Identifier/Virtual Channel Identifier (VPI/VCI) of the access port, etc.

Block 103: the authentication device receives the source MAC address and the access port information associated with the authentication request.

Block 104: the authentication device determines whether the source MAC address is stored in the authentication device. If the source MAC address is stored in the authentication device, block 106 may be performed; otherwise, block 105 may be performed.

Block 105: the authentication device determines that the source MAC address is not a counterfeit one and the authentication is passed, and stores a relationship of the source MAC address, the access port information and port information of the authentication device.

If the source MAC address is not stored in the authentication device, it is indicated that the authentication request is initiated by a new user.

Block 106: the authentication device retrieves the access port information according to the relationship between the stored source MAC address and the access port information, and determines whether the access port information sent by the access device is consistent with the access port information retrieved. If the access port information sent by the access device is consistent with the access port information retrieved, the authentication device determines that the source MAC address is a legal MAC address and the authentication is passed; otherwise, block 107 may be performed.

If the access port information in the authentication request is consistent with the access port information stored in the authentication device, it is indicated that the authentication request is sent by a user who has accessed the network.

Block 107: the authentication device determines that the source MAC address is a counterfeit MAC address, and returns to the access device an authentication failure message carrying the access port information.

Furthermore, after the authentication device determines that the source MAC address is a counterfeit MAC address, number of authentication failures at the access port corresponding to the source MAC address is recorded in the authentication device. If the number of authentication failures that occur at the access port within a preset time period is greater than a preset number, the authentication device notifies the access device to close the access port, that is, to inhibit any information from entering the network via the access port.

Block 108: on receipt of the authentication failure message, the access device deletes the source MAC address that is stored and corresponds to the access port information carried in the authentication failure message.

Furthermore, on receipt of the authentication failure message, the access device records the number of authentication failures that occur at the access port. If the number of the authentication failures that occur at the access port within a preset time period is greater than a preset number, the access device closes the access port.

Figure 2:
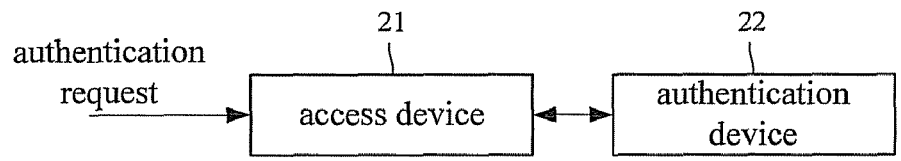
FIG. 2 is a schematic diagram illustrating a system for preventing MAC address counterfeiting in accordance with an embodiment of this invention.

FIG. 2 shows a schematic diagram illustrating a system for preventing MAC address counterfeiting in accordance with an embodiment of the present invention. As shown in FIG. 2, the system may include an access device 21 and an authentication device 22.

Access device 21 is configured to receive an authentication request that carries a source MAC address that is sent by a user via an access port, send to authentication device 22 the source MAC address and access port information associated with the authentication request, and store a relationship between the source MAC address and the access port information. On receipt of an authentication failure message that carries the access port information and is sent by authentication device 22, access device 21 is configured to delete the stored source MAC address corresponding to the access port information.

Access device 21 may include a first counting module configured to receive an authentication failure message that carries the access port information and is sent by authentication device 22, record the number of authentication failures that occur at the access port corresponding to the access port information, and close the access port if the number of the authentication failures that occur at the access port within a preset time period is greater than a preset number.

The access device may be a DSLAM device supporting broadband access, or an integrated access device supporting both broadband and narrowband accesses.

The user may access the access device via such access ports as ADSL or SHDSL or VDSL ports.

Access device 21 and authentication device 22 may either communicate with each other via a Metropolitan Area Network, or communicate with each other directly. Access device 21 may connect with the Metropolitan Area Network or authentication device 22 via its Asynchronous Transfer Mode (ATM) interface or Internet Protocol (IP) interface.

Authentication device 22 is configured to receive the source MAC address and access port information associated with the authentication request sent by access device 21, and determines whether the source MAC address is stored in authentication device 22. If the source MAC address is stored in authentication device 22, authentication device 22 determines whether the access port information corresponding to the source MAC address stored is consistent with the access port information sent by access device 21. If the access port information corresponding to the source MAC address stored is not consistent with the access port information sent by access device 21, authentication device 22 returns to access device 21 an authentication failure message carrying the access port information; otherwise, authentication device 22 stores a relationship of the source MAC address and the access port information.

Authentication device 22 may include a second counting module configured to record the number of authentication failures that occur at the access port after an authentication failure is detected, and send a port closing message carrying the access port information to access device 21 if the number of the authentication failures that occur at the access port within a preset time period is greater than a preset number.

The authentication device 22 may be a Broadband Remote Access Server (BRAS), or a DHCP server.

Figure 3:
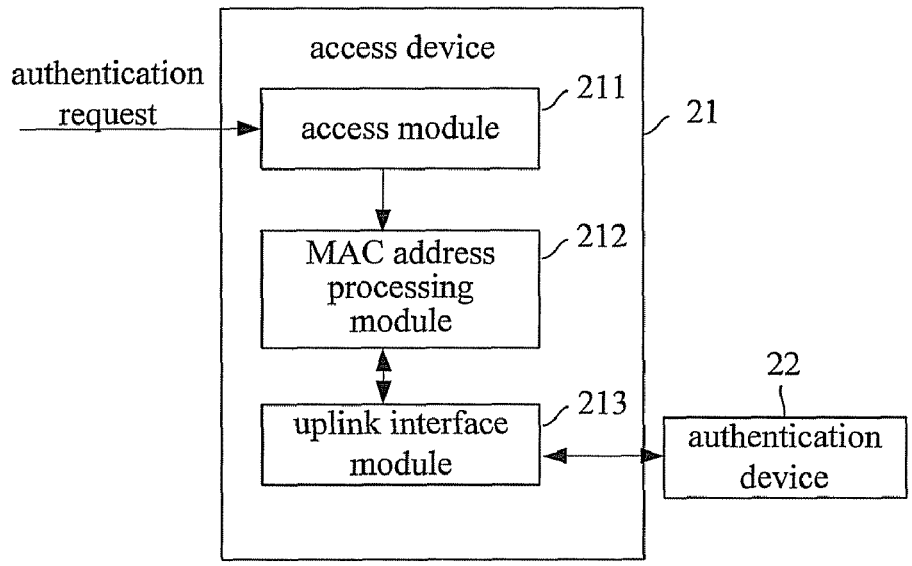
FIG. 3 is a schematic diagram illustrating an access device for preventing MAC address counterfeiting in accordance with an embodiment of this invention.

FIG. 3 shows a schematic diagram illustrating a structure of an access device for preventing MAC address counterfeiting in accordance with an embodiment of this invention. As shown in FIG. 3, access device 21 may include an access module 211, an MAC address processing module 212 and an uplink interface module 213.

Access module 211 is configured to receive an authentication request that carries a source MAC address and is sent by a user, and send the authentication request to MAC address processing module 212.

Access module 211 is configured with an xDSL interface, which may be an ADSL interface including ADSL2, ADSL2+ etc., or an SHDSL interface, or a VDSL interface.

MAC address processing module 212 is configured to receive the authentication request carrying the source MAC address from access module 211, store a relationship between the source MAC address and access port information, and send the access port information and the source MAC address associated with the authentication request to uplink interface module 213. On receipt of an authentication failure message carrying the access port information sent from the uplink interface module 213, MAC address processing module 212 deletes the source MAC address stored in it, wherein the source MAC address stored in MAC address processing module 212 are bound with the access port information carried in the authentication failure message.

MAC address processing module 212 may include a counting module configured to receive an authentication failure message carrying the access port information from uplink interface module 213, record the number of authentication failures that occur at the access port corresponding to the access port information carried in the authentication failure message, and close the access port if the number of the authentication failures that occur at the access port within a preset time period is greater than a preset number.

Uplink interface module 213 is configured to send to authentication device 22 the source MAC address and the access port information associated with the authentication request from the MAC address processing module 212, and send to MAC address processing module 212 the authentication failure message carrying the access port information received from authentication device 22.

Uplink interface module 213 may be configured with such uplink interfaces as Gigabit Ethernet (GE) interface (e.g., optical GE interface or electrical GE interface), Fast Ethernet (FE) interface (e.g., optical FE interface or electrical FE interface), Synchronous Transfer Mode (STM)-1 interface (e.g., optical STM-1 interface or electrical STM-1 interface), E1 interface, E3 interface, or STM-4 interface.

Figure 4:
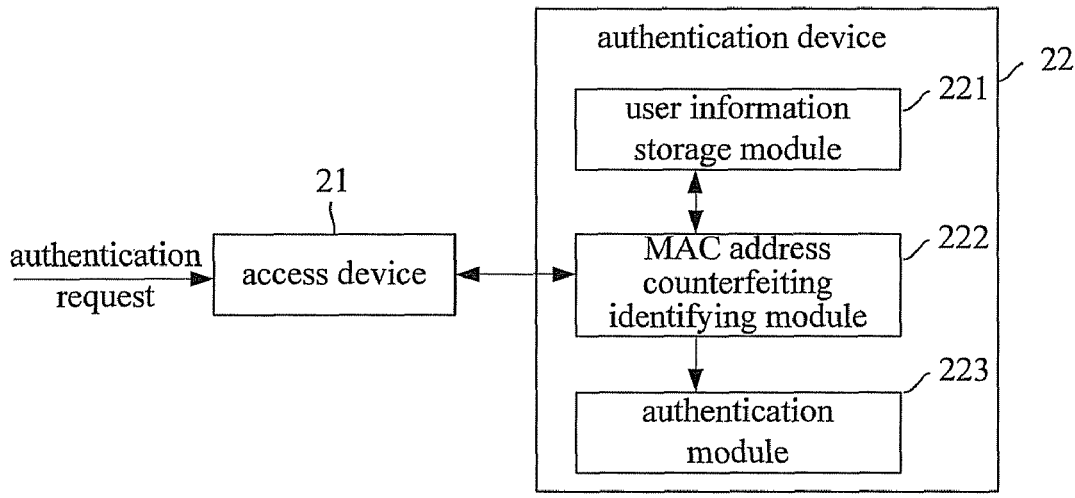
FIG. 4 is a schematic diagram illustrating an authentication device for preventing MAC address counterfeiting in accordance with an embodiment of this invention.

FIG. 4 shows a schematic diagram illustrating a structure of an authentication device for preventing MAC address counterfeiting in accordance with an embodiment of this invention. As shown in FIG. 4, authentication device 22 may include a user information storage module 221, an MAC address counterfeiting identifying module 222 and an authentication module 223.

User information storage module 221 is configured to store a relationship between the source MAC address and the access port information. On receipt of an enquiry message carrying the source MAC address and access port information from MAC address counterfeiting identifying module 222, if user information storage module 221 detects that the source MAC address carried in the enquiry message is not stored in user information storage module 221, user information storage module 221 sends to MAC address counterfeiting identifying module 222 a message indicating that the source MAC address does not exist, and stores a relationship of the source MAC address, the access port information, and port information of the authentication device. If user information storage module 221 detects that the source MAC address carried in the enquiry message is stored in user information storage module 221, and the stored access port information binding with the source MAC address is not consistent with the access port information sent by MAC address counterfeiting identifying module 222, user information storage module 221 returns to MAC address counterfeiting identifying module 222 a message indicating that the access port information from MAC address counterfeiting identifying module 222 is not consistent with the access port information stored in user information storage module 221. If user information storage module 221 detects that the source MAC address is stored in user information storage module 221, and the stored access port information binding with the source MAC address is consistent with the access port information sent by MAC address counterfeiting identifying module 222, user information storage module 221 returns to MAC address counterfeiting identifying module 222 a message indicating that the access port information from MAC address counterfeiting identifying module 222 is consistent with the access port information stored in user information storage module 221.

MAC address counterfeiting identifying module 222 is configured to receive the source MAC address and the access port information associated with the authentication request from access device 21, and send to user information storage module 221 an enquiry message carrying the source MAC address and the access port information. On receipt of either the message indicating that the source MAC address information does not exist, or the message indicating that the access port information from MAC address counterfeiting identifying module 222 is consistent with the access port information stored in user information storage module 221, MAC address counterfeiting identifying module 222 determines that the source MAC address is not a counterfeit one, and sends the authentication request to authentication module 223. On receipt of the message indicating that the access port information from MAC address counterfeiting identifying module 222 is not consistent with the access port information stored in user information storage module 221, MAC address counterfeiting identifying module 222 returns to access device 21 an authentication failure message carrying the access port information that is included in the enquiry message.

MAC address counterfeiting identifying module 222 may include a counting module configured to count the number of authentication failures that occur at the access port after an authentication failure is detected, and notifies access device 21 to close the access port if the number of the authentication failures that occur at the access port within a preset time period is greater than a preset number.

MAC address counterfeiting identifying module 222 supports PPPOE messages, PPPOA messages, DHCP messages, etc.

Authentication module 223 is configured to receive the authentication request from MAC address counterfeiting identifying module 222, and conduct an authentication.

The authentication module also supports PPPOE messages, PPPOA messages, DHCP message, etc.

The previous description of the disclosed embodiments is provided to enable those skilled in the art to make or use the present invention. Various modifications to these embodiments will be readily apparent to those skilled in the art and generic principles defined herein may be applied to other embodiments without departing from the scope of the invention. Thus, the present invention is not intended to be limited to the embodiments shown herein but is to be accorded the widest scope consistent with the principles and novel features disclosed herein.

The invention claimed is:

1. A method for preventing Media Access Control (MAC) address counterfeiting, comprising:

receiving, at an access device, an authentication request carrying a first source MAC address from an access port provided by the access device, wherein the authentication request is sent by a user device to the access device via the access port;

after receiving the authentication request, storing, at the access device, a relationship between the first source MAC address and the first access port information of the access port, and sending the first source MAC address and first access port information of the access port from the access device to an authentication device;

receiving, at the authentication device, the first source MAC address and the first access port information of the access port, wherein the first source MAC address and the first access port information are associated with the authentication request from the access port;

determining, at the authentication device, whether the first source MAC address received is a counterfeit MAC address by detecting whether the first source MAC address received is consistent with a second source MAC address that is stored in the authentication device and the first access port information received is consistent with second access port information that is stored in the authentication device, wherein the second access port information is bound with the second source MAC address; and if the first source MAC address received is a counterfeit MAC address, rejecting, by the authentication device, the authentication request by sending an authentication failure message including the first access port information from the authentication device to the access device;

in response to the authentication failure message, deleting the relationship between the first source MAC address and the first access port information of the access port at the access device.

2. The method of claim 1, further comprising:

adding, by the access device, the first access port information to the authentication request after receiving the authentication request carrying the first source MAC address from the access port; and sending the authentication request with the first source MAC address and first access port information of the access port from the access device to the authentication device;

wherein the process of receiving, by the authentication device, the first source MAC address and the first access port information of the access port comprises:

receiving, by the authentication device, the authentication request carrying the first source MAC address and the first access port information from the access device.

3. The method of claim 2, further comprising:

recording, by the authentication device, number of authentication failures that occur at the access port, and notifying the access device to close the access port if the number of authentication failures that occur at the access port within a preset time period is greater than a preset number.

4. The method of claim 1, wherein the process of receiving, by the authentication device, the first source MAC address and the first access port information of the access port comprises:

receiving, by the authentication device, the authentication request carrying the first source MAC address from the access device;

sending an enquiry message carrying the first source MAC address to the access device for inquiring the first access port information of the access port; and receiving the first access port information from the access device;

wherein after the access device receives the enquiry message carrying the first source MAC address, the access device sends the first access port information that corresponds to the first source MAC address according to the relationship between the first source MAC address and the first access port information of the access port at the access device.

5. The method of claim 4, wherein determining whether the first source MAC address received is a counterfeit MAC address comprises:

determining, by the authentication device, whether the first source MAC address received has been stored in the authentication device;

if the first source MAC address received is not stored in the authentication device, determining, by the authentication device, that the first source MAC address received is not a counterfeit MAC address, and storing a relationship between the first source MAC address and the first access port information received at the authentication device;

if the first source MAC address received is consistent with the second source MAC address stored in the authentication device, determining, by the authentication device, whether the first access port information received is consistent with the second access port information that is stored in the authentication device and corresponds to the second source MAC address; if the first access port information received is consistent with the second access port information, determining that the first source MAC address received is not a counterfeit MAC address; if the first access port information received is not consistent with the second access port information, determining that the first source MAC address is a counterfeit MAC address.

6. The method of claim 4, further comprising:

recording, by the authentication device, number of authentication failures that occur at the access port, and notifying the access device to close the access port if the number of authentication failures that occur at the access port within a preset time period is greater than a preset number.

7. The method of claim 1, wherein the process of determining whether the first source MAC address received is a counterfeit MAC address comprises:

determining, by the authentication device, whether the first source MAC address received has been stored in the authentication device;

if the first source MAC address received is not stored in the authentication device, determining, by the authentication device, that the first source MAC address received is not a counterfeit MAC address, and storing a relationship between the first source MAC address and the first access port information received at the authentication device;

if the first source MAC address received is consistent with the second source MAC address stored in the authentication device, determining, by the authentication device, whether the first access port information received is consistent with the second access port information that is stored in the authentication device and corresponds to the second source MAC address; if the first access port information received is consistent with the second access port information, determining that the first source MAC address received is not a counterfeit MAC address; if the first access port information received is not consistent with the second access port information, determining that the first source MAC address is a counterfeit MAC address.

8. The method of claim 1, further comprising:

after receiving the authentication failure message including the first access port information of the access port, recording, by the access device, number of authentication failures that occur at the access port, and closing the access port if the number of authentication failures that occur at the access port within a preset time period is greater than a preset number.

9. The method of claim 2, wherein determining whether the first source MAC address received is a counterfeit MAC comprises:

determining, by the authentication device, whether the first source MAC address received has been stored in the authentication device;

if the first source MAC address received is not stored in the authentication device, determining, by the authentication device, that the first source MAC address received is not a counterfeit MAC address, and storing a relationship between the first source MAC address and the first access port information received;

if the first source MAC address received is consistent with the second source MAC address stored in the authentication device, determining, by the authentication device, whether the first access port information received is consistent with the second access port information that is stored in the authentication device and corresponds to the second source MAC address; if the first access port information received is consistent with the second access port information, determining that the first source MAC address received is not a counterfeit MAC address; if the first access port information received is not consistent with the second access port information, determining that the first source MAC address is a counterfeit MAC address.

10. A system for preventing Media Access Control (MAC) address counterfeiting, comprising:

an access device, configured to receive an authentication request from an access port through which a user device accesses the access device, and after receiving the authentication request, send a first source MAC address and first access port information of the access port associated with the authentication request, and the authentication device, configured to receive the first source MAC address and the first access port information associated with the authentication request from the access device, determine whether the first source MAC address received is a counterfeit MAC address by detecting whether the received first source MAC address is consistent with a second source MAC address that is stored in the authentication device and the first access port information received is consistent with second access port information that is stored at the authentication device and is bound with the second source MAC address; and if the first source MAC address received is a counterfeit MAC address, reject the authentication request by sending an authentication failure message including the first access port information from the authentication device to the access device;

wherein the access device is configured to store a relationship between the first source MAC address and the first access port information of the access port after receiving the authentication request and delete the relationship between the first source MAC address and the first access port information of the access port in response to the authentication failure message.

11. The system of claim 10, wherein the authentication device comprises:
a MAC address counterfeiting identifying module, configured to determine whether the first source MAC address received is stored in the authentication device;
if the first source MAC address received is not stored in the authentication device, determine that the first source MAC address received is not a counterfeit MAC address, and store a relationship between the first source MAC address and the first access port information;
if the first source MAC address received is stored in the authentication device, determine whether the first access port information received is consistent with the second access port information; if the first access port information received is consistent with the second access port information, determine that the first source MAC address received is not a counterfeit MAC address; if the first access port information received is not consistent with the second access port information, determine that the first source MAC address is a counterfeit MAC address.

12. The system of claim 11, wherein the access device comprises a first counting module, configured to record number of authentication failures that occur at the access port after receiving the authentication failure message including the first access port information of the access port, and close the access port if the number of authentication failures that occur at the access port satisfies a condition.

13. The system of claim 11, wherein the authentication device comprises:
a second counting module, configured to record the number of authentication failures that occur at the access port, and notify the access device to close the access port if the number of authentication failures that occur at the access port satisfies a condition.

14. The system of claim 10, wherein the access device comprises a first counting module, configured to record number of authentication failures that occur at the access port after receiving the authentication failure message including the first access port information of the access port, and close the access port if the number of authentication failures that occur at the access port satisfies a condition.

15. The system of claim 10, wherein the authentication device comprises:
a second counting module, configured to record the number of authentication failures that occur at the access port, and notify the access device to close the access port if the number of authentication failures that occur at the access port satisfies a condition.

16. An access device for preventing Media Access Control (MAC) address counterfeiting, comprising:
an access module, configured to receive an authentication request carrying a first source MAC address from an access port provided thereon, via which a user device accesses the access device, and send the authentication request;
an MAC address processing module, configured to receive the authentication request from the access module, and send the first source MAC address and first access port information of the access port, wherein the first source MAC address and the first access port information are associated with the authentication request; and
an uplink interface module, configured to receive the first source MAC address and the first access port information from the MAC address processing module, and send the first source MAC address and the first access port information to an authentication device, and receive an authentication failure message including the first access port information from the authentication device and send the authentication failure message to the MAC address processing module in response to determining, at the authentication device, based upon whether the first source MAC address received is a counterfeit MAC address by detecting whether the first source MAC addresss received is consistent with a second source MAC address that is stored in the authentication device and the first access port information received is consistent with second access port information that is stored in the authentication device wherein the second access port information is bound with the second source MAC address;
wherein the MAC address processing module is configured to store a relationship between the first source MAC address and the first access port information of the access port after receiving the authentication request from the access module and delete the relationship between the first source MAC address and the first access port information of the access port after receiving the authentication failure message.

17. The access device of claim 16, wherein the MAC address processing module comprises a counting module, configured to record number of authentication failures that occur at the access port after receiving the authentication failure message, and close the access port if the number of authentication failures that occur at the access port satisfies a condition.

* * * * *